(12) United States Patent
Heraldo et al.

(10) Patent No.: US 8,048,935 B2
(45) Date of Patent: Nov. 1, 2011

(54) LIQUID FOAM SYSTEMS AND ASTM E-84 CLASS 1 RATED RIGID, HIGH-DENSITY POLYURETHANE FOAMS AND ARTICLES PREPARED THEREFROM

(75) Inventors: John Heraldo, Mechanicsville, VA (US); Milen Kirilov, Glen Allen, VA (US)

(73) Assignee: Carpenter Co., Richmond, VA (US)

( * ) Notice: Subject to any disclaimer, the term of this patent is extended or adjusted under 35 U.S.C. 154(b) by 0 days.

(21) Appl. No.: 10/983,092

(22) Filed: Nov. 8, 2004

(65) Prior Publication Data

US 2006/0100295 A1 May 11, 2006

(51) Int. Cl.
*C08G 18/28* (2006.01)

(52) U.S. Cl. ......... 521/108; 521/99; 521/128; 521/129; 521/130; 521/131; 521/164; 521/167; 521/172; 521/173

(58) Field of Classification Search ............... 521/99, 521/108, 130, 172, 128, 129, 131, 164, 167, 521/173
See application file for complete search history.

(56) References Cited

U.S. PATENT DOCUMENTS

| | | | |
|---|---|---|---|
| 2,846,597 A | 8/1958 | Hovnanian et al. | |
| 3,644,457 A | 2/1972 | Konig et al. | |
| 3,925,266 A | 12/1975 | Fabris et al. | |
| 4,053,439 A | 10/1977 | Chlystek | |
| 4,221,875 A | 9/1980 | Yukuta et al. | |
| 4,232,085 A | 11/1980 | Carlstrom et al. | |
| 4,256,847 A | 3/1981 | Spector | |
| 4,263,411 A | 4/1981 | Bak | |
| 4,265,806 A | 5/1981 | Grundmann et al. | |
| 4,374,207 A | 2/1983 | Stone et al. | |
| 4,385,131 A | 5/1983 | Fracalossi et al. | |
| 4,407,981 A | 10/1983 | Aaronson | |
| 4,533,679 A | 8/1985 | Rawlings | |
| 4,774,268 A | 9/1988 | Marx et al. | |
| 4,797,428 A | 1/1989 | Reichmann | |
| 4,940,632 A | 7/1990 | Nicola et al. | |
| 5,100,936 A | 3/1992 | Inverarity et al. | |
| 5,102,919 A | 4/1992 | Swab | |
| 5,124,367 A | 6/1992 | Barker et al. | |
| 5,173,515 A | 12/1992 | von Bonin et al. | |
| 5,177,118 A | 1/1993 | Dueber et al. | |
| 5,254,597 A | 10/1993 | Horn et al. | |
| 5,268,393 A | 12/1993 | Blount | |
| 5,276,066 A | 1/1994 | Paulik et al. | |
| 5,552,450 A | 9/1996 | Hinz et al. | |
| 5,624,969 A | 4/1997 | Seifert et al. | |
| 5,684,092 A | 11/1997 | Seifert et al. | |
| 5,693,686 A * | 12/1997 | Szabat et al. ................. 521/131 |
| 5,760,115 A | 6/1998 | Okisaki et al. | |
| 5,779,775 A | 7/1998 | Kuwabara et al. | |
| 5,874,021 A | 2/1999 | Inazawa et al. | |
| 5,895,792 A | 4/1999 | Rotermund et al. | |
| 5,981,612 A | 11/1999 | Keppeler et al. | |
| 6,130,267 A | 10/2000 | Dueber et al. | |
| 6,281,393 B1 | 8/2001 | Molina et al. | |
| 6,319,962 B1 | 11/2001 | Singh et al. | |
| 6,464,903 B1 | 10/2002 | Blount | |
| 6,660,782 B1 | 12/2003 | Matijega | |
| 6,727,290 B2 | 4/2004 | Roth | |
| 2003/0050354 A1 | 3/2003 | Gilman et al. | |

FOREIGN PATENT DOCUMENTS

EP 0 422 797 4/1991
GB 002 177 406 1/1987

OTHER PUBLICATIONS

"Standard Test Method for Surface Burning Characteristics of Building Materials", An American National Standard, Designation E-84-03; dated Apr. 2003, 19 pages.

* cited by examiner

*Primary Examiner* — John Cooney
(74) *Attorney, Agent, or Firm* — Smith Gambrell & Russell, LLP

(57) ABSTRACT

An all-liquid foam-forming system contains:
 a first part (A) containing at least one liquid isocyanate or polyisocyanate; and
 a second part (B) containing: at least one liquid aromatic polyester polyol having an hydroxyl value of at least 110 mg KOH/gram and an average hydroxyl functionality of at least 2, at least two liquid halogenated flame retardants and water;
 the foam-forming system having an NCO/OH ratio of from about 0.9:1 to about 1.3:1;
 wherein the first and second parts are such that reaction therebetween forms a rigid polyurethane foam having a density of at least about 5 pcf and an ASTM E-84 Class 1 rating.

Resultant polyurethane foams can be used to make articles, particularly for use in commercial decorative molding applications.

9 Claims, 11 Drawing Sheets

LIQUID FOAM SYSTEMS AND ASTM E-84 CLASS 1 RATED RIGID, HIGH-DENSITY POLYURETHANE FOAMS AND ARTICLES PREPARED THEREFROM

BACKGROUND OF THE INVENTION

The present invention relates to foam systems and rigid polyurethane foams prepared therefrom. More particularly, this invention relates to all-liquid foam systems and to high-density, rigid polyurethane foams prepared therefrom which have an ASTM E-84 Class 1 rating. The invention further relates to articles formed from the polyurethane foams.

Rigid polyurethane foams are well known and are commonly prepared from organic polyisocyanates and organic polyols together with known blowing agents, surfactants and catalysts for the reaction of —OH and —NCO groups. Such foams are used in construction, refrigeration and insulation applications because they may be prepared in a wide variety of densities and because they are substantially closed cellular structures which essentially fail to elastically deform. Rigid polyurethane foams are also commonly used in the decorative molding market. Such market includes such products as crown molding, chair rails, picture frames, ceiling medallions, louvers and the like. Historically, rigid, high-density polyurethane foams have not been used in large commercial applications because of their poor fire performance as set forth in the NFPA 101® Life Safety Code® Handbook. As a result, commercial decorative molding is limited to currently approved materials such as wood, plaster and concrete.

Fire performance requirements for rigid polyurethane foams have centered on achieving a Class 1 rating under the basic combustibility test set forth in American Society of Testing Materials (ASTM) E-84 "Standard Test Method for Surface Burning Characteristics of Building Materials" (approved Mar. 10, 2003), which is incorporated by reference herein in its entirety. The ASTM E-84 test is used to assess the spread of flame on the surface of a material. In this test, a 24 foot long by 18 inches wide foam specimen is exposed to a controlled air flow and flaming fire exposure, adjusted so as to spread a flame along the entire length of a select grade oak specimen in 5.5 minutes. Generally, the test is performed on core foam of chosen thickness but on occasion it is performed on faced products. Flame spread and smoke density are the two parameters measured in the test. The Flame Spread Index (FSI) takes into account both the rate and total distance of the propagation of a flame front, measured visually. The smoke factor is a time-integrated measurement of the occlusion of a visible beam of light. Material performance is put into categories, namely 0-25 flame spread index is class I, 26-75 is class II, and 76-225 is class III. A smoke limit of 450 or less is required in each of these classes. ASTM E-84 also has a number of other designations, such as Underwriters Laboratories 723, National Fire Prevention Association 255, or International Conference of Building Officials 8-1. For a detailed discussion of the ASTM E-84 test, reference is made, e.g., to U.S. Pat. No. 6,319,962, which is hereby incorporated by reference herein in its entirety.

As noted above, to receive an ASTM E-84 Class 1 rating, a foam must have a flame spread of 25 or less and a smoke developed density (or smoke generation) value of 450 or less. Using conventional urethane technology, high-density, typical rigid polyurethane foams have failed to meet ASTM E-84 Class 1 standards due to the large amount of fuel available for consumption at higher densities. Failures to meet Class 1 standards have historically been related to high smoke-developed densities.

Polyurethane foams described as rigid and flame retardant are disclosed, e.g., in U.S. Pat. Nos. 4,053,439; 4,407,981; 5,268,393 (also discloses flame-retardant flexible polyurethane foams); U.S. Pat. Nos. 5,874,021; and 6,130,267 (directed to both fire retardant rigid and fire retardant flexible polyurethane foams). Rigid polyurethane foams said to have an ASTM E-84 Class 1 rating are disclosed, e.g., in U.S. Pat. Nos. 4,797,428; 4,940,632; 5,102,919; and 6,319,962.

U.S. Pat. No. 4,053,439 to Chlystek reports a flame-retardant, low-smoke generating polyurethane foam having incorporated therein a flame-retardant and smoke-inhibiting composition comprising in combination a halogen-containing, fire-retardant organic material and at least one metallic salt of an organic polycarboxylic acid free of acid functionality. The Chlystek patent teaches that the halogen-containing compound may be a reactive or non-reactive halogen-containing compound or may be in the form of a halogenated compound containing active hydrogen groups such as a polyol. The composition may further contain a non-reactive phosphorus-containing flame retardant such as tris(chloroethyl)phosphate, tris(chloropropyl)-phosphate, tris(2,3-dichloropropyl)phosphate, tris(2,3-dibromopropyl)phosphate, bis(beta-chloroethyl)vinyl phosphate. Chlystek does not state whether the foam therein meets standards set forth in the ASTM E-84 test.

U.S. Pat. No. 4,407,981 to Aaronson reports a flame-retarded polyurethane foam containing polyurethane, a two-component flame retardant system consisting of an additive first flame retardant containing dialkyl alkylphosphonate and a second flame retardant containing organochlorine or organobromine (e.g., trichloroisopropyl alcohol or dibromoneopentyl glycol) incorporated in a polyether polyol. The Aaronson patent teaches that the polyurethane foam therein has a flame spread index of 0-75 and a smoke developed density of less than 450 when subjected to ASTM Test E-84. The flame spread index and smoke developed density of the Aaronson polyurethane foam appear to fall within the Class 2 standards of ASTM Test E-84.

U.S. Pat. No. 5,268,393 to Blount reports a rigid, flame retardant polyurethane foam consisting of the reaction product of an organic phosphorus-containing compound, a polyisocyanate, optionally a polyurethane catalyst, and optionally a foam stabilizer.

U.S. Pat. No. 5,874,021 to Inazawa et al. reports a method for making a low-fuming rigid polyurethane foam, involving foaming of a mixture containing a polymethylenepolyphenyl polyisocyanate or a modified material thereof, an aromatic polyester polyol, an aromatic polyether polyol, at least one metallic catalyst, a blowing agent which is an adduct of a primary or secondary amine compound with carbon dioxide, and, if necessary, a flame retardant and a surfactant. The only flame retardant specifically identified is tris(beta-chloropropyl)phosphate at col. 9, Table 2.

U.S. Pat. No. 6,130,267 to Dueber et al. reports flexible and rigid polyurethane foams formed from fire retardant compositions containing a dispersion of a solid fire retardant such as melamine, ammonium polyphosphate or guanidine carbonate in a liquid organic polyisocyanate which contains dispersed polymer particles.

As stated above, the aforementioned patents to Chlystek, Aaronson, Blount, Inazawa et al. and Dueber et al. do not disclose whether the rigid polyurethane foams taught therein meet ASTM E-84 Class 1 standards.

U.S. Pat. No. 4,797,428 to Reichmann reports rigid flame resistant polyurethane foams made by reacting an aromatic polyisocyanate with a mixture of 25-75% of an oligoester and another isocyanate-reactive material in the presence of a blowing agent at an NCO index of less than 300. The Reichmann patent teaches that the foams therein have an ASTM E-84 Class 1 rating and are particularly useful in construction applications. The patent teaches that the foams therein can have densities above and below 2 pcf. However, the highest foam density disclosed in the patent relative to the invention foam is 2.5 pcf (see col. 9, System F).

U.S. Pat. No. 4,940,632 to Nicola et al. reports an ASTM E-84 Class 1 rated polyurethane foam formed by reacting a polymethylene poly(phenyl)isocyanate-based isocyanate, one or more aromatic polyester polyols having hydroxyl functionalities of 2.4 or more and hydroxyl numbers of 350 or more, one or more polyether polyols having hydroxyl functionalities of 4 or more and hydroxyl numbers of 340 or more, one or more flame retardants, and one or more blowing agents, one or more catalysts, and one or more surfactants. Flame retardants which the patent to Nicola et al. teaches can be used therein include PHT4-diol and tris(chloropropyl) phosphate (Fyrol® PCF).

U.S. Pat. No. 5,102,919 to Swab reports rigid polyurethane/polyisocyanurate flame resistant foams, comprising an organic aromatic isocyanate, an active hydrogen-containing polyol component, a non-reactive flame retardant, a catalyst, co-blowing agents comprising water and a volatile blowing agent, a surfactant, optionally solubilizers, optionally fillers, pigments, crosslinkers or chain extenders, and an effective smoke-reducing amount of a mixture of dimethylesters of adipic acid, glutaric acid and succinic acid. Swab teaches that the foams therein have an ASTM E-84 Class 1 rating.

U.S. Pat. No. 6,319,962 to Singh et al. reports rigid polyurethane foams having improved flame resistance, wherein the foams are prepared from a composition containing an isocyanate, an isocyanate-reactive composition, a hydrocarbon/water blowing agent, and a phosphorus material. According to Singh et al., the foam therein meets ASTM E-84 Class 1 rating standards. The foam density is said to be less than 4.0 pcf, preferably less than 3.5 pcf, most preferably 2.0 pcf.

Although rigid polyurethane foams having an ASTM E-84 rating are reported in the art, high-density urethane molders continue to search for foam systems that can form high-density, rigid polyurethane foams meeting the ASTM E-84 Class 1 rating so as to be appropriate for use in, for example, large commercial decorative molding applications. It is further desirable that such foam systems have a processability similar to that of non-fire-rated foam systems so as to avoid having to use alternate or modified dispersing equipment.

SUMMARY OF THE INVENTION

The present invention is based on the discovery that an all-liquid foam-forming system composed of selected polyol, isocyanate and flame retardant components can be used to form a high-density, rigid polyurethane foam which meets ASTM E-84 Class 1 standards and is suitable for use, e.g., in large-scale decorative molding applications.

As used herein, the term "all-liquid foam-forming system" means that the foam-forming reactants, i.e., the polyol, isocyanate, and flame retardants, and any additional additives present are liquid.

The all-liquid foam-forming system of this invention contains:
  a first part (A) containing at least one liquid isocyanate or polyisocyanate; and
  a second part (B) containing:
    at least one liquid aromatic polyester polyol having an hydroxyl value of at least 110 mgKOH/gram and an average hydroxyl functionality of at least 2,
    at least two liquid halogenated flame retardants, and water;

the foam-forming system having an NCO/OH ratio of from about 0.9:1 to about 1.3:1;

wherein the first and second parts are such that reaction therebetween forms a rigid polyurethane foam having a density of at least about 5 pcf and an ASTM E-84 Class 1 rating.

The all-liquid foam-forming system of this invention has a processability (e.g., reduced working times, quick demolding, good liquid flow and good surface quality) similar to that of non-fire-rated foam systems. Other benefits of an all-liquid system include the ability to use current equipment, an absence of settling of solids, no need for special storage conditions, and ease of conversion from standard material.

The all-liquid foam-forming system may further contain one or more liquid polyether polyols, one or more liquid catalysts, and one or more liquid blowing agents.

The present invention is also directed to rigid, high-density flame retardant polyurethane foams formed from the foregoing all-liquid foam-forming system. Such polyurethane foams meet ASTM E-84 Class 1 rating standards and have a density of at least about 5 pounds per cubic foot (pcf), preferably from about 5 to about 30 pcf more preferably from about 5 to about 20 pcf (e.g., 15 pcf).

The present invention also provides articles, for example, articles for use in large-scale commercial decorative applications, containing the polyurethane foam of this invention. Thus, a further aspect of the present invention is directed to articles such as, e.g., stucco and wood panels, crown moldings, ceiling medallions, flowerpots, column bases, bricks, rock formations, and other building-related articles, which are formed from the polyurethane foam of this invention.

DETAILED DESCRIPTION OF THE INVENTION

Figure 1:
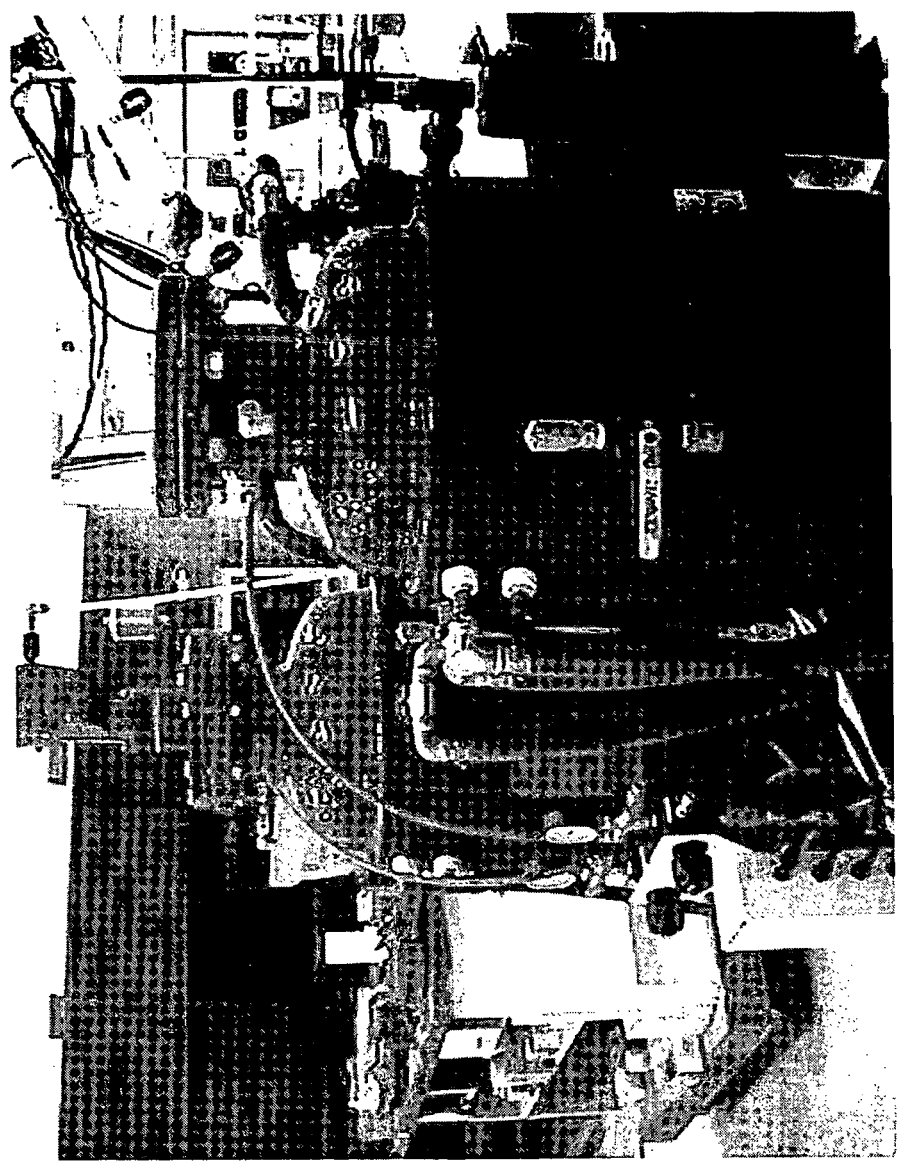
FIG. 1 shows typical A-side and B-side holding tanks, which were used to hold the two parts of the all-liquid foam-forming system of this invention.

As stated above, the present invention provides an all-liquid foam-forming system and high-density, rigid polyurethane foams formed from the all-liquid foam-forming system and having an ASTM E-84 Class 1 rating.

With respect to polyurethane foams of the present invention, the term "rigid" refers to polyurethane foams having a closed cellular structure which essentially fails to elastically deform (i.e., when a rigid foam deforms, it deforms permanently) and which has load-bearing capability. In addition, with respect to the polyurethane foams of this invention, the term "high-density" refers to a density of at least about 5 pcf.

The all-liquid polyurethane foam-forming system of this invention contains two parts, i.e., part (A) and part (B). Part (A) contains at least one liquid isocyanate or polyisocyanate; and part (B) contains at least one liquid aromatic polyester polyol having an hydroxyl value of at least 110 mgKOH/gram and an average hydroxyl functionality of at least 2, at least two liquid halogenated flame retardants, and water.

As used herein, the term "hydroxyl number" (also known as "hydroxyl value") refers to a quantitative measure of the concentration of hydroxyl groups, usually stated as mg KOH/g, i.e., the number of milligrams of potassium hydroxide equivalent to the hydroxyl groups in 1 gram of substance.

The term "hydroxyl functionality", as used herein, refers to the number of reactive groups, e.g., hydroxyl groups, in a chemical molecule.

Preferably, the isocyanate or polyisocyanate in part (A) (also referred to herein as "the isocyanate-containing part") of the foam-forming system of this invention comprises at least one liquid aromatic isocyanate selected from the group consisting of diphenylmethane diisocyanate ("MDI"), polymethylene polyphenylene polyisocyanate ("polymeric MDI") and mixtures of the foregoing.

When the aromatic isocyanate is MDI, it is preferably in the form of its 2,2'-, 2,4'- and 4,4'-isomers or mixtures thereof. Suitable MDI isocyanates for use in the present invention are disclosed, e.g., in U.S. Pat. Nos. 3,644,457; 4,544,679; 4,797,428; and 6,319,962; each of the foregoing references being incorporated by reference herein in their entirety.

Commercially available liquid aromatic isocyanates which can be used in the present invention include, e.g., Mondur® 489 and Mondur® (Light), both of which are polymeric MDI manufactured by Bayer Corporation, which is headquartered in Pittsburgh, Pa., U.S.A.

As noted above, part (B) (also referred to herein as "the polyol-containing part") of the foam-forming system of this invention includes at least one liquid aromatic polyester polyol having an hydroxyl value of at least 110 mg KOH/gram and an average hydroxyl functionality of at least 2. Preferred liquid aromatic polyester polyols for use in the present invention includes, e.g., aromatic polyester polyols having a hydroxyl value of from about 110 to about 350 mg KOH/gram, a viscosity of from about 1500 to about 22,000 cps at 25° C., a hydroxyl functionality of from about 2 to about 3, and an average equivalent weight of from about 175 to about 240.

Particularly preferred liquid aromatic polyester polyols for use in the present invention are those which are manufactured by KoSa under the Terate® designation. Because of their particular aromatic backbone, Terate® polyester polyols are reported to possess an inherent flammability advantage. When used in rigid polyurethane foams, these polyols provide excellent char formation with minimal shrinkage and high weight retention.

Specific examples of preferred Terate® polyols for use in the foam-forming system of this invention include, e.g., Terate® 2031, Terate® 2540, Terate® 2540L and Terate® 4020. Terate® 2031 polyester polyol has a hydroxyl value of from about 280 to about 335 mg KOH/gram, a viscosity of from about 3000 to about 22,000 cps at 25° C., a functionality of about 2.3, and an average equivalent weight of about 181. Terate® 2540 and 2540L polyester polyols have a hydroxyl value of from about 225 to about 275 mg KOH/gram, a viscosity of from about 2700 to about 7700 cps at 25° C., a functionality of about 2.0, and an average equivalent weight of about 238. Terate® 4020 polyester polyol has a hydroxyl value of from about 295 to about 350 mg KOH/gram, a viscosity of from about 1500 to about 6000 cps at 25° C., a functionality of from about 2.0 to about 2.2, and an average equivalent weight of about 175.

Another preferred aromatic polyester polyol for use in the present invention is commercially available from Stepan Company (which is headquartered in Northfield, Ill., U.S.A.) under the designation Stepanpol® PD-110LV, which is a diethylene glycol/orthophthalate based polyester polyol having a hydroxyl functionality of 2.0, a molecular weight of 975, a viscosity of about 800 cps at 25° C., and an hydroxyl number of from 110 to 120 mg KOH/gm.

The at least one aromatic polyester polyol is present in the system of this invention in an amount of at least about 26%, preferably from about 26% to about 47%, more preferably from about 27% to about 42%, and most preferably from about 32% to about 40%, by weight of the combined weight of parts (A) and (B).

The polyol-containing part of the foam-forming system may further contain one or more polyether polyols conventionally used in the manufacture of rigid polyurethane foams.

For example, suitable polyether polyols include any polymers or polycondensation products which contain ethylene oxide, propylene oxide or tetrahydrofuran. The molecular weight of the polyether polyols is preferably in the range of from about 700 to 6000 g/mol, and the OH number is usually from about 20 to about 600, preferably from about 25 to about 240.

Polyether polyols that can be used in the present invention include, for example, products made from the addition of propylene oxide to a simple polyol such as glycol, glycerol, trimethylolpropane, and sorbitol in the presence or absence of ethylene oxide; polyether polyols with an amino base, obtained by the addition of propylene oxide or ethylene oxide to amines; halogenated polyether polyols; grafted polyether polyols resulting from the copolymerization of styrene and acrylonitrile in a suspension in a polyether; or polytetramethylene glycol.

Suitable polyether polyols for use in the present invention also include various hydroxylated compounds such as hydroxylated polybutadienes, prepolymers with hydroxy terminals (resulting from the reaction of an excess of polyol with a diisocyanate), or simple polyols such as glycerol or amino alcohols used in a small quantity with the polyether polyols or polyester polyols to increase the degree of crosslinking.

Examples of suitable polyether polyols are disclosed, e.g., in U.S. Pat. Nos. 5,254,597; 5,268,393; and 6,660,782; each of the foregoing patents being hereby incorporated by reference in their entirety.

Examples of suitable commercially available polyether polyols for use in the present invention include, e.g., polyether polyols available from Carpenter Company of Richmond, Va. (USA) under the Carpol® designation, for example: propylene glylcol-based diols made with propylene oxide and available under the designations PGP-400, PGP-1000, PGP-2000, and PGP-4000; propylene glycol-based diols made with propylene oxide and 50% ethylene oxide cap and available under the designations PGP-2050 and PGP-4025; glycerine-based triols made with propylene oxide and available under the designations GP-700, GP-1000, GP-1500, GP-3000, GP-4000 and GP-5000; glycerine-based triols made with propylene oxide and 25% ethylene oxide cap and available under the designations GP-725, GP-1535, GP-3008, GP-3510, GP-4520, GP-5015, GP-6015 and GP-6515; sucrose, amine-based polyols with high functionality and low viscosity and available under the designations SPA-357 and SPA-530; glycerine, sucrose-based polyols with high viscosity made with propylene oxide and available under the designation "GSP-355"; Mannich-based polyol available under the designation MX-470; triol-based, acrylonitrile dispersed polymer polyols available under the designation GAN-5021; and triol-based, SAN dispersed polymer polyols available under the designation GSAN-5022.

Other suitable polyether polyols for use in the foam-forming system of this invention include those available from The Dow Chemical Company (which is headquartered at Midland, Mich., U.S.A.) under the designations Voranol® 280 and Voranol® 360.

Preferred polyether polyols for use in the present invention include, e.g., glycerine, sucrose-based polyether polyols having a hydroxyl functionality of about 5.5 and an hydroxyl number of from about 350 to about 370 mg KOH/gram; sucrose, amine-based polyether polyols having a functionality of about 5.5 and an hydroxyl number of from about 335 to about 365 mg KOH/gram; glycerine-based triols made with propylene oxide and having an hydroxyl functionality of about 3 and an hydroxyl number of from about 230 to about 250 mg KOH/gram; sucrose/glycerine-initiated polyether polyols having an hydroxyl functionality of about 7 and an hydroxyl number of about 280 mg KOH/gram; and sucrose/glycerine-initiated polyether polyols having an hydroxyl functionality of about 4.5 and an hydroxyl number of about 360 mg KOH/gram.

The amount of the one or more polyether polyols in the foam-forming system of this invention preferably ranges from 0% to no more than about 2.0% by weight of the combined weights of parts (A) and (B).

Part (B) of the foam-forming system of this invention preferably further contains at least two liquid halogenated flame retardants. Suitable liquid halogenated flame retardants include, e.g., halogen-substituted organic phosphates such as, for example, tri(2-chloroethyl)phosphate, tri(2-chloroisopropyl)phosphate, tri(1,3-dichloropropyl)phosphate, tri(2,3-dibromopropyl)phosphate and tetrakis(2-chloroethyl)ethylene diphosphate. Suitable liquid halogenated flame retardants also include liquid brominated organic flame retardants.

Preferably, a first of the liquid halogenated flame retardants is a halogen-substituted organic phosphate and a second of the liquid halogenated flame retardants is a brominated organic compound. The first liquid halogenated flame retardant is preferably tri(2-chloroisopropyl)phosphate. Such flame retardant can be commercially obtained from Akzo Nobel Functional Chemicals LLC (headquartered at Dobbs Ferry, N.Y., U.S.A.) under the designation Fyrol® PCF. The second liquid halogenated flame retardant is preferably tetrabromophthalate diol. This flame retardant can be commercially obtained from Great Lakes Chemical Corporation (which is headquartered at West Lafayette, Ind., U.S.A.) under the designation PHT4-Diol™.

The liquid halogenated flame retardants are present in the foam-forming system of this invention in an amount preferably ranging from about 3% to about 16%, more preferably from about 6% to about 14%, and most preferably from about 8% to about 12%, % by weight of the combined weight of parts (A) and (B). If the two liquid halogenated flame retardants are tri(2-chloroisopropyl)phosphate and tetrabromophthalate diol, the amount of the tri(2-chloroiso-propyl)phosphate preferably ranges from about 1% to about 7% by weight of the combined weight of parts (A) and (B), and the amount of the tetrabromophthalate diol preferably ranges from about 3% to about 13% by weight of the combined weight of parts (A) and (B).

Part (B) of the foam-forming system of this invention may further contain one or more liquid non-halogenated flame retardants, including, for example, organic phosphorus flame retardants such as, e.g., alkyl acid phosphates (e.g., methyl or butyl acid phosphate), trialkyl phosphates (e.g., triethyl phosphate), dimethyl methyl phosphate, diethyl ethyl phosphonate, oligomeric phosphate esters based on ethylene glycol diphosphate, oligomeric cyclic phosphonate, oligomeric phenylphosphonates, triarylphosphates, aminophosphorus compounds such as diethyl N,N-bis(2-hydroxyethyl)-aminomethylphosphonate or phosphonitriles, phosphine oxides, and dialkyl or diaryl phosphinic acids. A particularly suitable non-halogenated flame retardant which can be used in the present invention is diethyl-N,N-bis(2-hydroxyethyl)aminomethyl phosphonate (commercially available from Akzo Nobel Functional Chemicals LLC (headquartered at Dobbs Ferry, N.Y., U.S.A.) under the designation "Fyrol® 6"). The amount of the one or more liquid non-halogenated flame retardants, if present, preferably ranges from about 1 to about 8%, more preferably from about 1 to about 6%, and most preferably from about 3% to about 5%, by weight of the combined weight of parts (A) and (B).

Part (B) of the foam-forming system further contains water, which acts as a means to achieve the desired density and which can also function as a blowing agent. If used to control the density of the resultant foam, the amount of water ranges from about 0.2 to about 1%, more preferably from about 0.3 to about 0.8%, and most preferably from about 0.4 to about 0.7%, by weight of the combined weight of parts (A) and (B). If also used additionally as a blowing agent, the total amount of water preferably ranges from about 0.4 to about 2% by weight of the combined weight of parts (A) and (B). An additional liquid blowing agent may be used in combination with the water in part (B). Examples of such liquid blowing agents include, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane, butane, hexane, heptane and diethyl ether. If present, the blowing agent used in combination with water is preferably present in an amount of from about 0.5 to about 8%, more preferably from about 1% to about 6%, and most preferably from about 2% to about 4%, by weight of the combined weight of parts (A) and (B).

Part (B) of the foam-forming system preferably includes at least one liquid catalyst which is effective to catalyze reaction of the polyol(s) in part (B) with the isocyanate in part (A). Any suitable catalyst may be used, including: tertiary amines, such as, e.g., triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like; tertiary phosphines, such as, e.g., trialkylphosphines and dialkylbenzylphosphines; chelates of various metals; acid metal salts of strong acids; strong bases; alcoholates and phenolates of various metals; salts of organic acids with various metals; organometallic derivatives of tetravalent tin, trivalent and pentavalent As, Sb and Bi and metal carbonyls of iron and cobalt; and mixtures of the foregoing. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408, which is hereby incorporated by reference herein in its entirety.

Suitable catalysts for use in this invention are disclosed, e.g., in U.S. Pat. Nos. 5,254,597; 5,268,393; 6,281,393; and 6,660,782, which are incorporated by reference herein in their entirety.

Specific examples of suitable amine catalysts include, e.g., the reactive amine catalysts commercially available from TOSOH USA, Inc. (which is headquartered at Grove City, Ohio, U.S.A.) under the designation Toyocat® (for example, Toyocat® F-94) and the tertiary amine catalysts commercially available from Air Products and Chemicals, Inc. (headquartered at Allentown, Pa., U.S.A.) under the designation Dabco® for example, Dabco® 8154 and Dabco® 33-LV). Specific examples of suitable tin catalysts include, e.g., those commercially available from Air Products and Chemicals, Inc. under the designation Dabco® (for example, Dabco® 120). Specific examples of suitable potassium catalysts include, e.g., those commercially available from Air Products and Chemicals, Inc. under the designation Dabco® (for example, Dabco® K-15).

If used, the catalyst is preferably present in the foam-forming system of this invention in an amount of from about 0.03 to about 0.3%, more preferably from about 0.04 to about 0.20%, and most preferably from about 0.05 to about 0.13%, by weight of the combined weight of parts (A) and (B).

The foam-forming system of this invention may further include one or more liquid surfactants. Particular examples of suitable surfactants include nonionic surfactants and wetting agents, such as those prepared by the sequential addition of propylene oxide and then ethylene oxide to propylene glycol, the liquid organosilicones, polyethylene glycol ethers of long chain alcohols, tertiary amine or alkylolamine salt of long chain alkyl acid sulfate esters, alkyl sulfonic ester and alkyl arylsulfonic acids. The surface active agents prepared by the sequential addition of propylene oxide and then ethylene oxide to propylene glycol and liquid organosilicones are preferred. Liquid organosilicones which are not hydrolyzable are more preferred. Examples of non-hydrolyzable organosilicones include those available under the trademarks "Dabco® DC 5043," "Dabco® DC 5169" and "Dabco® DC 5244," available from Dow Corning Corp., Freeland, Mich. (USA) and "Tegostab® B-8404 and Tegostab® 8462, available from Th. Goldschmidt Chemical Corp., Hopewell, Va. (USA).

If used, the surfactant(s) is preferably present in an amount of from about 0.3% to about 2%, more preferably from about 0.5% to about 1.5%, and most preferably from about 0.5% to about 1.0%, by weight of the combined weight of parts (A) and (B).

The foam-forming system of this invention may further contain at least one liquid chain extending agent in the polyol-containing part of the system. Examples of suitable chain extending agents include, e.g., compounds having at least two functional groups bearing active hydrogen atoms such as water, hydrazine, primary and secondary diamines, amino alcohols, amino acids, hydroxyl acids, glycols, and mixtures thereof. Preferred chain extending agents include, e.g., water, ethylene glycol, 1,4-butanediol, and primary and secondary diamines such as, for example, phenylene diamine, 1,4-cyclohexane-bis-(methylamine), ethylenediamine, diethylenetriamine, N-(2-hydroxypropyl)ethylenediamine, N,N'-di(2-hydroxypropyl)-ethylenediamine, piperazine, and 2-methylpiperazine. If used, the liquid chain extending agent(s) is preferably present in an amount of from about 0.5% to about 5%, more preferably from about 2% to about 4.5%, and most preferably from about 3 to about 4.5%, by weight of the combined weight of parts (A) and (B).

The all-liquid foam-forming system of this invention is a well-formulated system with good processability. For example, the system has particularly good properties in terms of hardness, cream time, cure time, brittleness, post-expansion and viscosity. These properties are generally as follows:

Hardness—resists a fingernail imprint or Hardness Shore A 95 to 100.

Cream time—typically 35 seconds or more between dispense time and start of rise is an acceptable time.

Cure time—typically no more than 15 minutes but can be more or less time depending on the size and shape of part.

Brittleness—After demold or after 24 hours, if the corners of the part do not snap-off easily when manipulated by hand, then product is deemed acceptable. Also, if a finished part does not abrade into powder in the finishing process, then the part is acceptable.

Post-expansion—0% is the norm.

Viscosity—All dependent on the capability of dispensing units used to dispense polyol. Typical numbers for polyol range between 700 centipoise and 4000 centipoise.

Mix ratio—Typical target mix ratio is 1 to 1 parts by weight of isocyanate to polyol. Most of the machines can only handle, at the most, no more than a 2 to 1 mix ratio of isocyanate to polyol or polyol to isocyanate.

Index—Index target is between 0.95 to 1.2 (NCO/OH). Typically if the index exceeds 1.2, increases in brittleness and durability are expected.

The rigid, high-density polyurethane foam of this invention is the reaction product of the all-liquid forming system of this invention. The foam can be used to form in articles in large-scale commercial decorative molding applications. An article for use in decorative applications can be formed from different techniques as, for example, subjecting the polyurethane foam of this invention to conventional molding techniques or to conventional spray techniques.

Figure 2:
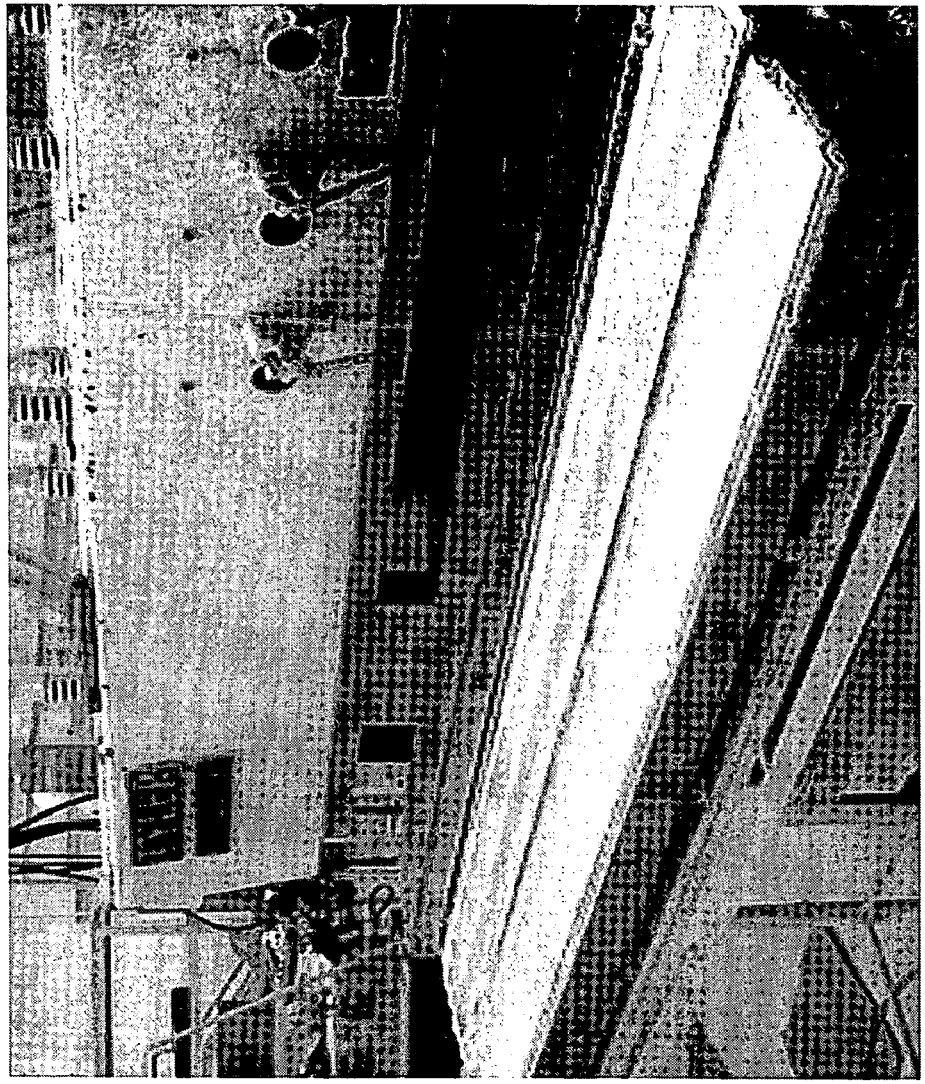
FIG. 2 shows a mold which was used to form a crown molding from the foam of this invention.
Figure 3:
FIG. 3 shows the foam of this invention being poured into the mold shown in FIG. 2 to form a crown molding.

Prior to their use to form the high-density, rigid polyurethane foam of this invention, parts (A) and (B) of the foam-forming are typically kept apart. FIG. 1 shows A-side and B-side holding tanks that were used to hold parts (A) and (B) of the system of this invention prior to the mixing of the two parts. The two parts are then mixed using commercially available equipment, e.g., a static mixer, to produce a homogeneous blend. The two parts are preferably mixed at a temperature of from about 15° C. to about 38° C. The resulting mixture can then placed in an open or closed mold as appropriate for the article being formed. FIG. 2 shows a mold which has been used to form an article (specifically a crown molding) from the foam of this invention. FIG. 3 shows the foam of this invention being poured into the mold shown in FIG. 2.

The amount of reactant mixture introduced into the mold is such that the resulting foamed article has a density of at least about 5 pcf.

Figure 4:
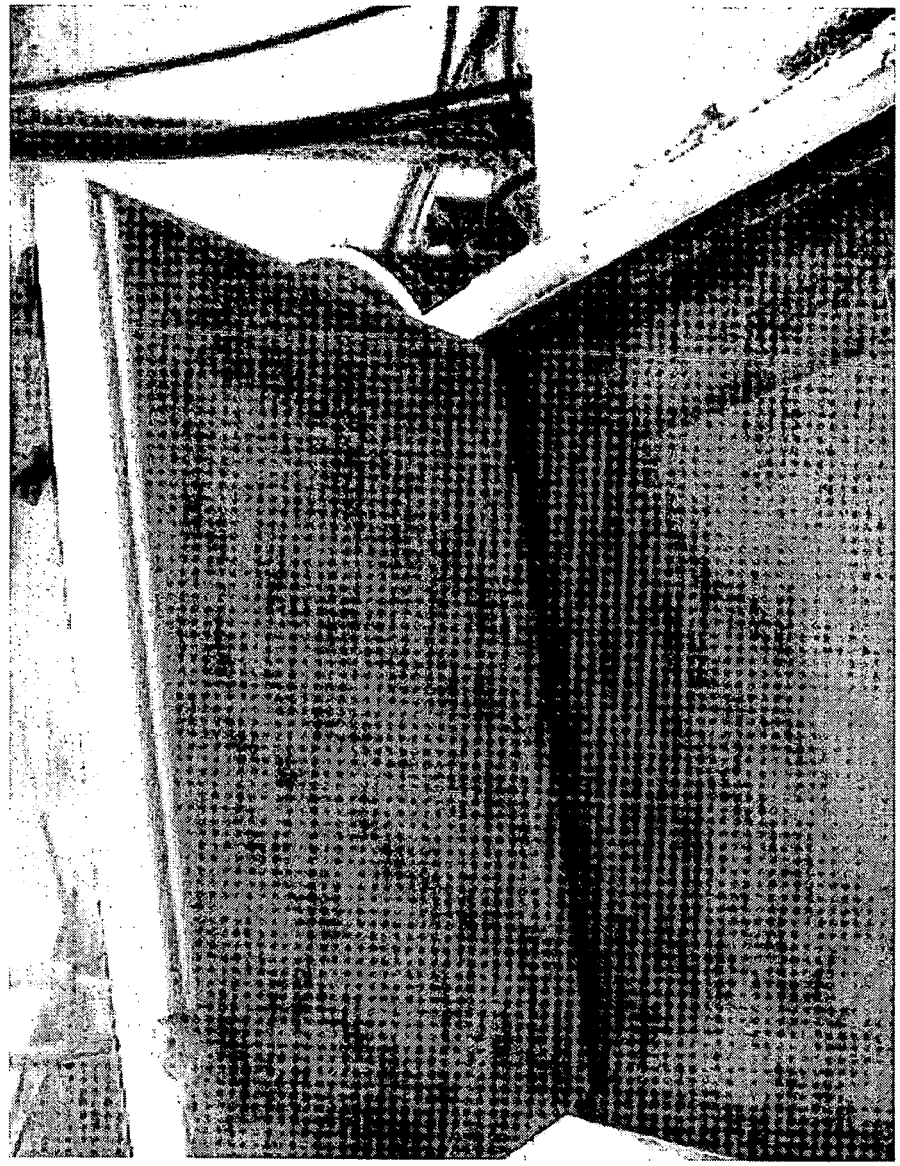
FIG. 4 shows a molded article being removed from a mold that can be used in the present invention.

In the mold, the foam is allowed to cure. The mold temperature is typically from about 25° C. to about 50° C. or above. The foam is allowed to age and expand to form a rigid foam. The finished article is then demolded. FIG. 4 shows an example of a molded foam article being removed from a mold.

Alternatively, the foam-forming ingredients may simply be combined in a suitable container and mixed. The resulting "bun" may thereafter be cut into whatever shape is desired for the application contemplated.

In a further alternative, the foam-forming ingredients may be fed through a mixing nozzle of a dispenser, such as a hand held gun, and sprayed on a substrate where the foam is desired, e.g., side walls, a roof top, on pipes, to get a stucco effect or finish.

The polyurethane foam of this invention has a density of at least about 5 pcf, preferably from about 5 to about 30 pcf, more preferably from about 5 to about 20 pcf. Particular preferred density ranges will depend on whether the foams are to be formed in free rise molding processes or packed molding processes. For example, for free rise molding processes, the preferred density range is from about 5 to about 15 pcf. For packed molding processes, the preferred density range is from about 8 to about 20 pcf. Free-rise density is the measured density of the foam sample when foamed without a fixed volume. Packed density is the measured density of the foam sample when foamed into a fixed volume. Density is equal to mass divided by volume.

As stated previously herein, the rigid, high-density polyurethane foam of this invention can be used, for example, in articles in large-scale commercial decorative molding applications. Therefore, a further aspect of the present invention is directed to articles formed from the foam of this invention, such articles including, e.g., crown moldings, flowerpots, wood panels, column bases, brick fascias, rock formations, stucco panels or layers, ceiling medallions and other building-related articles, which are formed from the polyurethane foam of this invention.

Figure 5:
FIG. 5 shows a crown molding formed using the foam and mold shown in FIG. 3.
Figure 6:
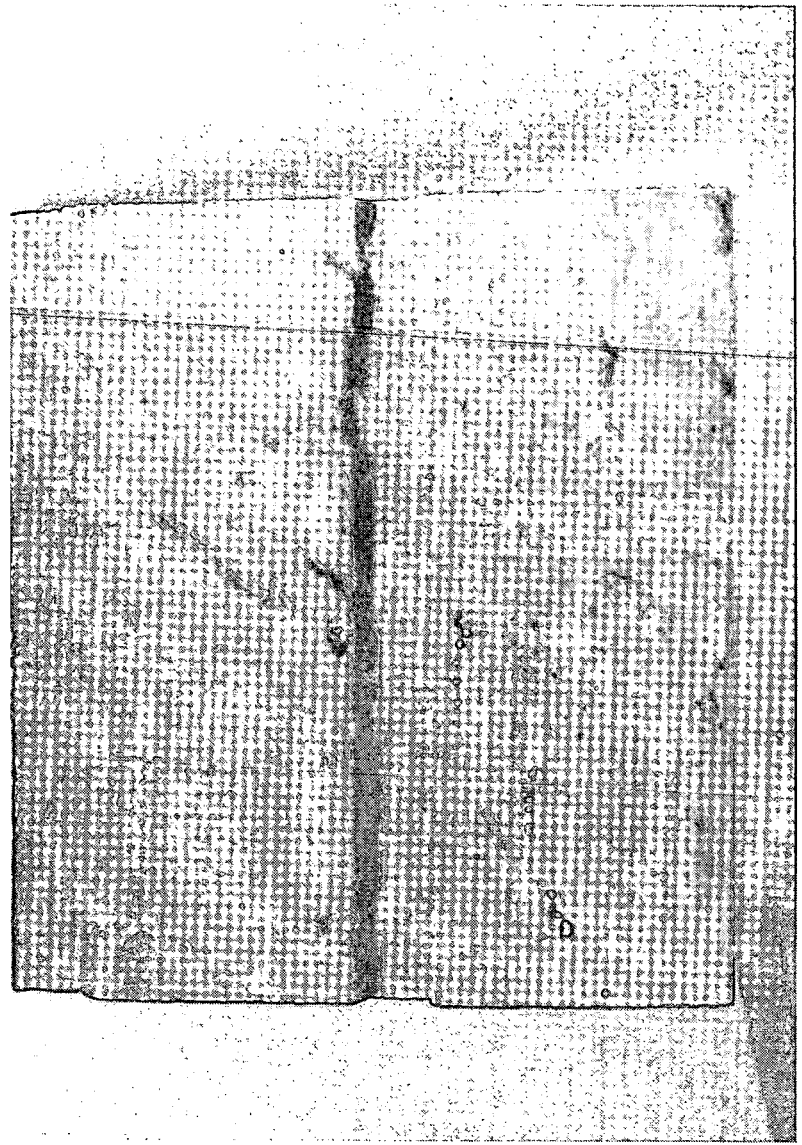
FIG. 6 shows a brick fascia molding which can be formed using the foam of this invention.
Figure 7:
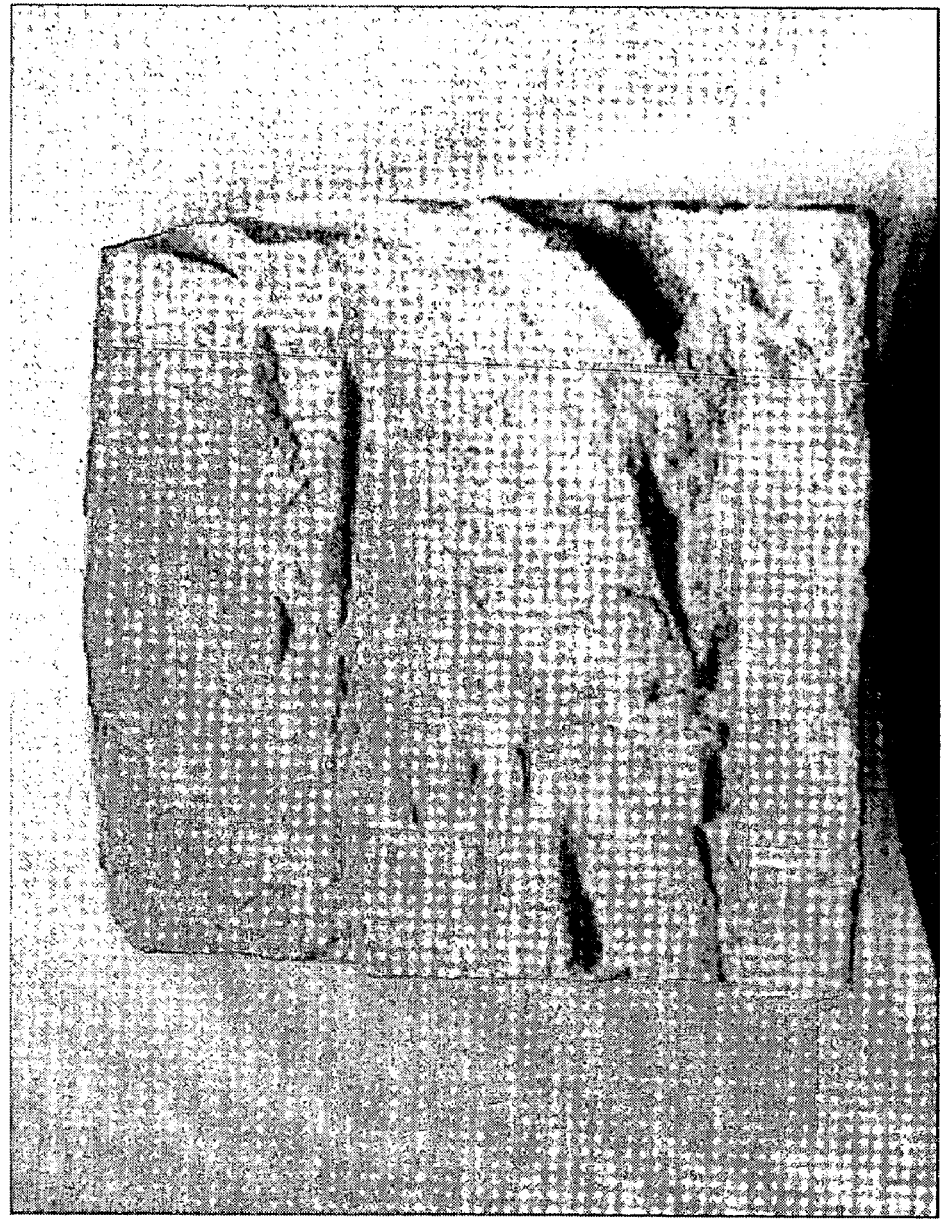
FIG. 7 shows a rock formation which can be formed using the foam of this invention.
Figure 8:
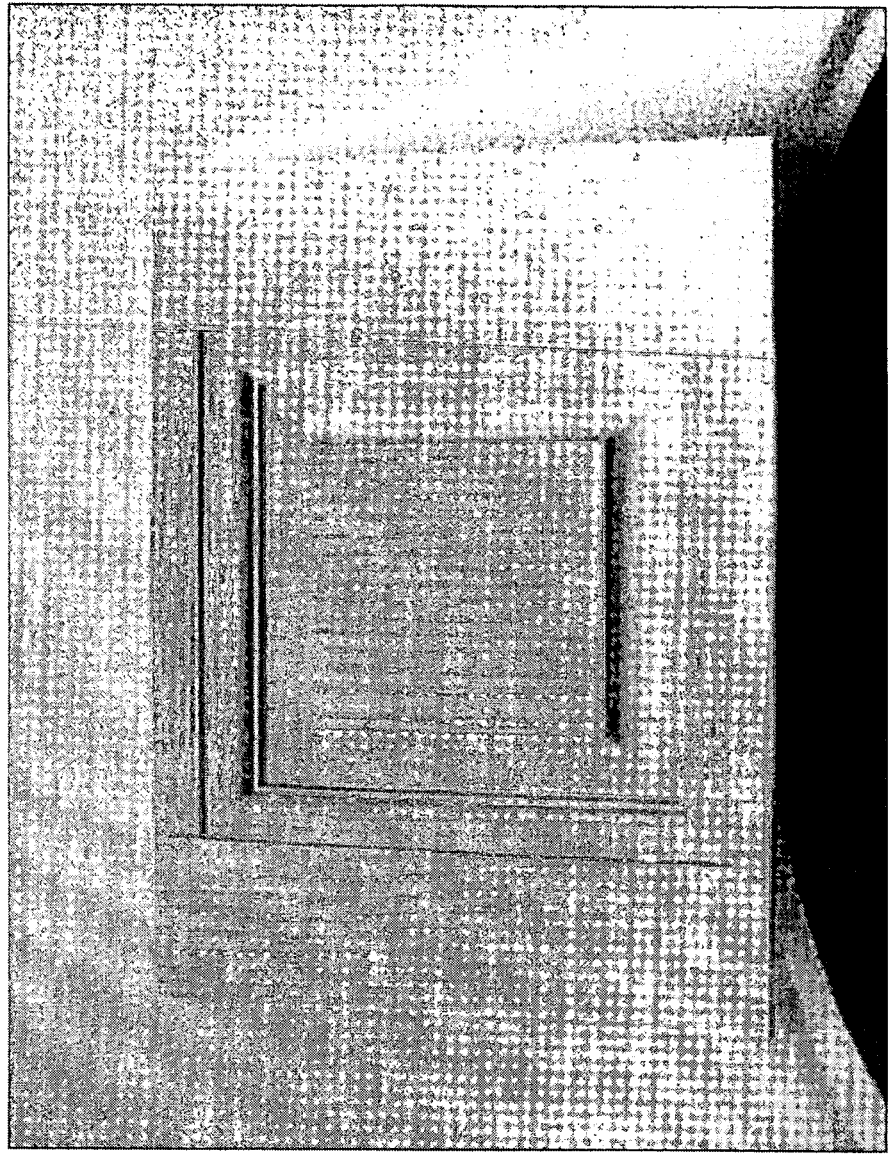
FIG. 8 shows a wood paneling which can be formed using the foam of this invention.
Figure 9:
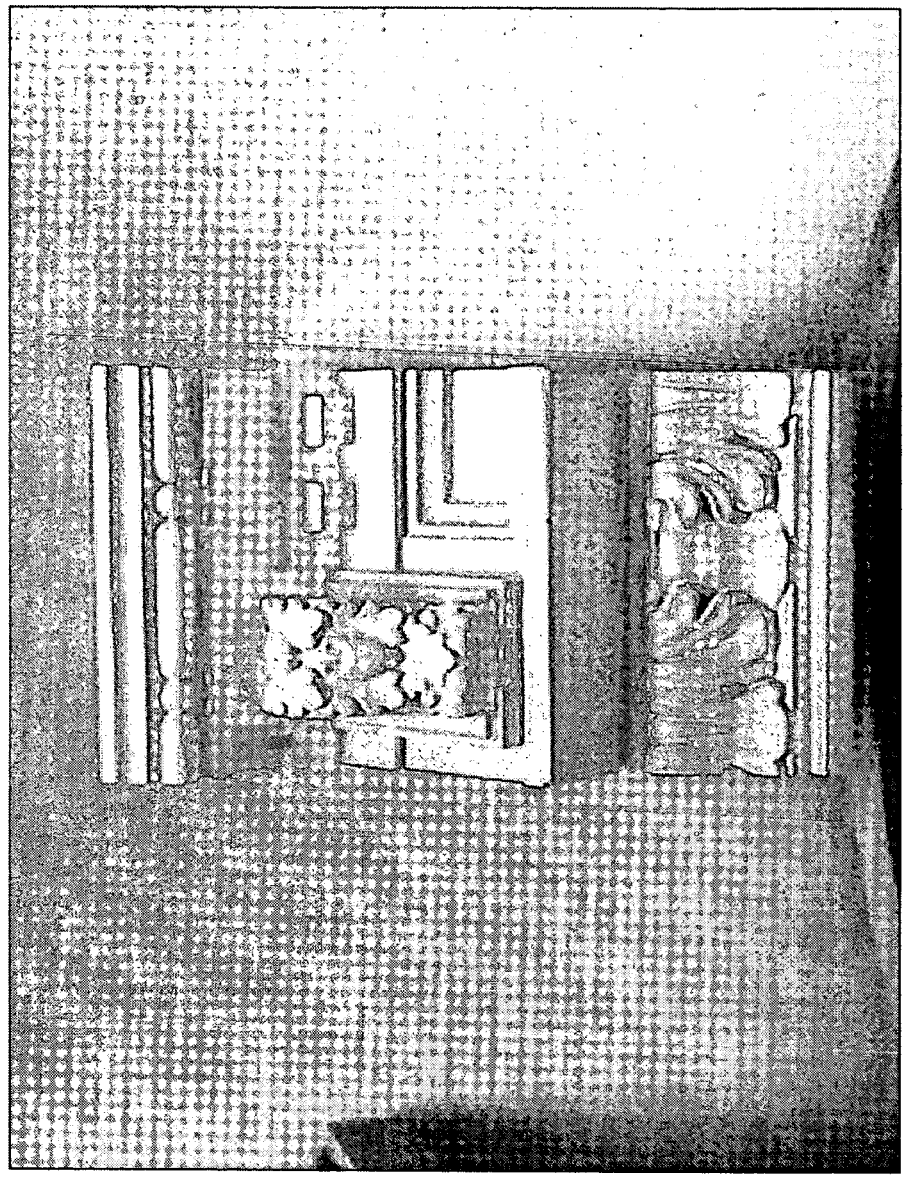
FIG. 9 shows a high-detailed crown molding portion which can be formed using the foam of this invention.
Figure 10:
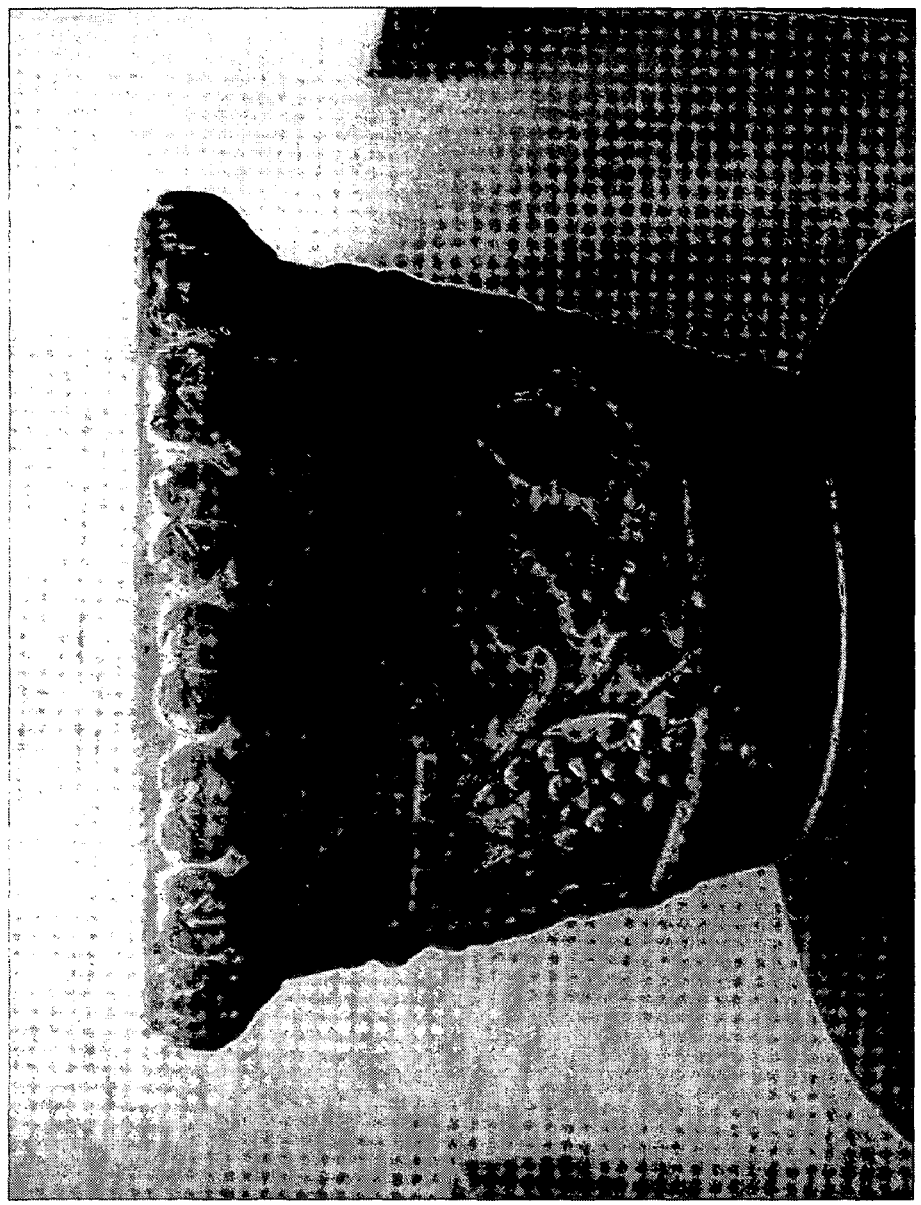
FIG. 10 shows a flowerpot which can be formed using the foam of this invention.

FIG. 5 shows a crown molding formed from the foam and mold shown in FIG. 3.

Figure 11:
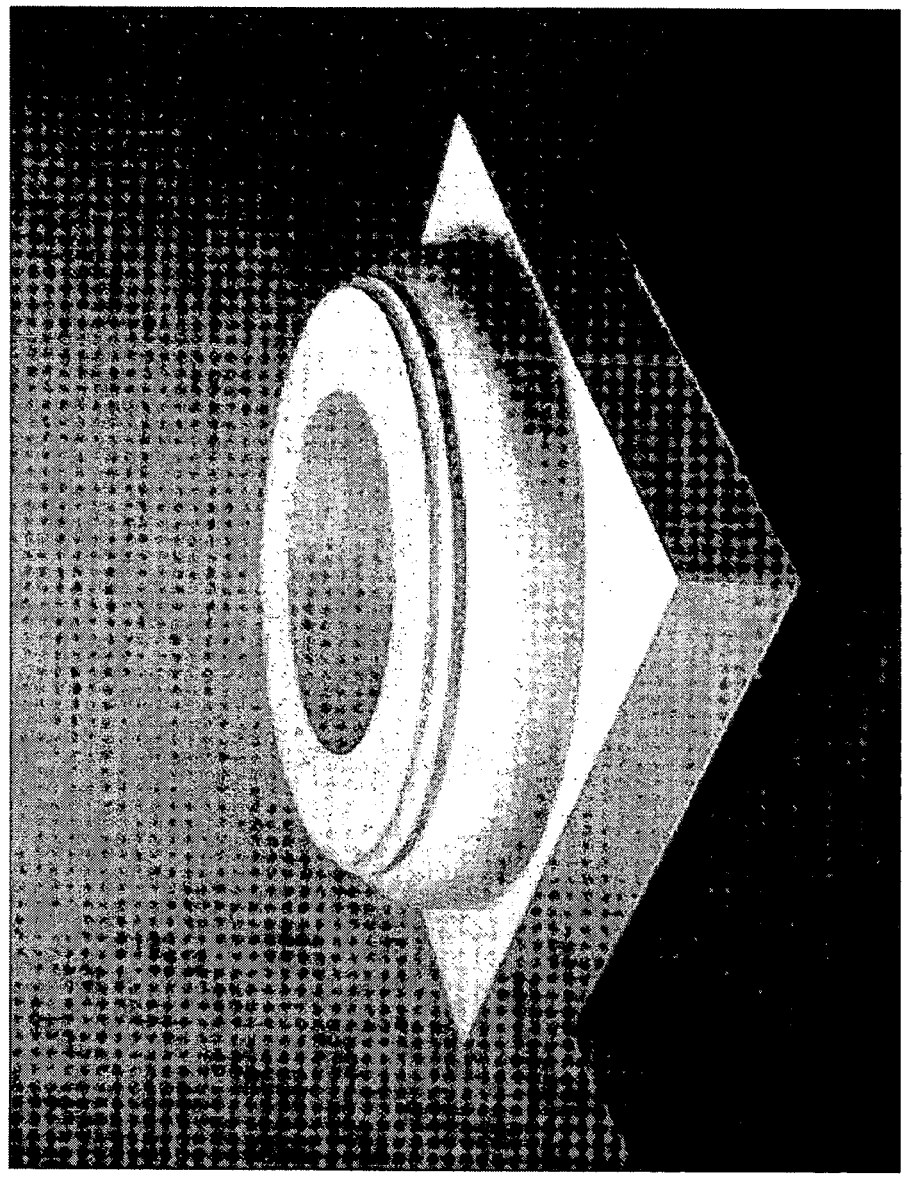
FIG. 11 shows a column base which can be formed using the foam of this invention.

Non-limiting examples of articles which can be formed from the foam of the present invention include those shown in FIGS. 6-11, e.g., a brick fascia molding (FIG. 6), a rock formation (FIG. 7), a wood paneling (FIG. 8), a highly detailed crown molding (FIG. 9), a flower pot (FIG. 10) and a column base (FIG. 11).

The invention is illustrated but not limited by the following Examples.

EXPERIMENTAL

Comparative Examples A-C and Invention Examples 1-4

Comparative Examples A-C and Invention Examples 14 illustrate the effect on a polyurethane foam's combustibility properties of using: no liquid halogenated flame retardant (Comparative Example A), only one liquid halogenated flame retardant (Comparative Examples B and C), and two liquid halogenated flame retardants (Invention Examples 1-4).

In Comparative Examples A-C and Examples 1-4, seven one-inch thick polyurethane foam panels were prepared from seven compositions having the specific formulations set forth in Table I below. The panels underwent ASTM E-84 burn testing at Omega Point Laboratories in San Antonia, Tex. The Flame Spread and Smoke Density values of the panels are set forth in Table I below.

In Table I, the terms "Terate® 4020", "PHT4-Diol", "PCF", "M-489" and "MR Light" have the following meanings:

"Terate® 4020"—an aromatic polyester polyol commercially available from KoSa and having an hydroxyl value of 295-350 mg KOH/g, a viscosity of 1500-6000 cps at 25° C., an hydroxyl functionality of 2.0-2.2, an acidity of 0.2-1.5 mg KOH/g, an average equivalent weight of 175 and a specific gravity of 1.2 g/ml.

"PHT4-Diol™": a tetrabromophthalate diol having a molecular weight of about 520 and a hydroxyl value of about 215, which is commercially available from Great Lakes Chemical Corporation.

"PCF": a tri(2-chloroisopropyl)phosphate flame retardant commercially available from Akzo Nobel Chemicals, Inc., under the designation Fyrol® PCF.

"M-489": a polymeric MDI (diphenylmethane diisocyanate) commercially available from Bayer Corporation under the designation Mondur® 489.

"MR Light": a polymeric MDI commercially available from Bayer Corporation under the designation Mondur® MR (Light).

The amounts of ingredients listed in Table I are in parts by weight.

TABLE I

Comparative Examples A–C and Invention Examples 1–4: Formulations/Flame Spread/Smoke Density

| | Example No. | | | | | | |
|---|---|---|---|---|---|---|---|
| | A | B | C | 1 | 2 | 3 | 4 |
| Ingredient | | | | | | | |
| Terate ® 4020 | 100 | 100 | 100 | 100 | 100 | 100 | 100 |
| PHT4-Diol | 0 | 14 | 0 | 14 | 14 | 14 | 14 |
| PCF | 0 | 0 | 7 | 7 | 7 | 7 | 7 |
| M-489 | 90 | 90 | 90 | — | — | 90 | 90 |
| MR Light | — | — | — | 90 | 90 | — | — |
| Properties | | | | | | | |
| Density (pcf) | 14 | 14 | 14 | 14 | 20 | 14 | 20 |
| Flame Spread | 90 | 30 | 40 | 15 | 15 | 20 | 20 |
| Smoke Density | >500 | 400 | 350 | 450 | 250 | 250 | 300 |

The data set forth in Table I shows that foam panels prepared from compositions containing no liquid halogenated flame retardant or containing only one liquid halogenated flame retardant do not meet the standards of an ASTM E-84 Class 1 rating. However, foam panels prepared from compositions containing both of the halogenated liquid flame retardants do achieve an ASTM E-84 Class 1 rating.

Comparative Examples D-J and Invention Example 5

Eight polyurethane foam panels of varying thicknesses were prepared from compositions having the formulations set forth in Table II below. The panels underwent ASTM E-84 burn testing at Omega Point Laboratories in San Antonio, Tex. and Underwriters Laboratories Inc. in Northbrook, Ill. The Flame Spread and Smoke Density values of the panels are also set forth in Table II.

The following terms used in Table II have the meanings set forth below:

"Terate® 2031"—an aromatic polyester polyol commercially available from KoSa and having an hydroxyl value of 280-335 mg KOH/g, a viscosity of 3000-22,000 cps at 25° C., an hydroxyl functionality of 2.3, an acidity of 0.5-4.0 mg KOH/g, an average equivalent weight of 181 and a specific gravity of 1.2 g/ml.

"Terate® 2540"—an aromatic polyester polyol commercially available from KoSa and having an hydroxyl value of 225-275 mg KOH/g, a viscosity of 2700-7700 cps at 25° C., an hydroxyl functionality of 2.0, an acidity of 0.4-2.0 mg KOH/g, an average equivalent weight of 238 and a specific gravity of 1.2 g/ml.

"PD-110LV"—an ortho phthalate-diethylene glycol-based aromatic polyester polyol commercially available from Stepan Company under the designation "Stepanpol® PD-110 LV" and having a viscosity of 8000 at 25° C. and an hydroxyl value of 110.

"GSP-355"—a glycerine, sucrose-based polyol made with propylene oxide and commercially available from Carpenter Company.

"TEAP-265"—a triethanolamine propoxylated polyol commercially available from Carpenter Company with a viscosity of 465 cps at 25° C., a hydroxyl range of 625 to 645 mg KOH/g, a functionality of 3, and a total amine value range of 205 to 220 mg KOH/g.

"SPA-357"—sucrose, amine-based polyol commercially available from Carpenter Company.

"V-280"—a sucrose/glycerine-initiated polyether polyol having an hydroxyl functionality of about 7 and an hydroxyl number of about 280 mg KOH/g, which is commercially available from The Dow Chemical Company under the designation "Voranol® 280".

"PHT4-Diol"—a tetrabromophthalate diol having a molecular weight of about 520 and a hydroxyl of about 215, which is commercially available from Great Lakes Chemical Corporation.

"Fyrol PCF"—a tri(2-chloroisopropyl)phosphate flame retardant commercially available from Akzo Nobel Chemicals, Inc., under the designation Fyrol® PCF.

"Fyrol 6"—diethyl-N,N-bis(2-hydroxyethyl)aminoethyl phosphonate

"Dabco A-33"—an amine catalyst commercially available from Air Products and Chemicals.

"Dabco 8154"—an amine catalyst commercially available from Air Products and Chemicals.

"Toyocat F-94"—a specialty amine catalyst commercially available from Tosoh Corporation.

"Dabco K-15"—a trimerization catalyst commercially available from Air Products and Chemicals, Inc., which is a mixture of 75% potassium 2-ethylhexoate and 25% diethyl glycol.

"Curithane 52®"—a trimerisation metal catalyst commercially available from Air Products and Chemicals, Inc.

"Dabco 120"—a tin-based catalyst commercially available from Air Products and Chemicals, Inc.

"B-8408"—a silicone surfactant commercially available from Goldschmidt Chemical Corporation under the designation "Tegostab® B-8408".

"B-8418"—a silicone surfactant commercially available from Goldschmidt Chemical Corporation under the designation "Tegostab® B-8408".

"B-8433"—a silicone surfactant commercially available from Goldschmidt Chemical Corporation under the designation "Tegostab® B-8433".

"N-95"—alkylphenol ethoxylate (a nonionic surfactant) commercially available from Huntsman Petrochemical Corporation under the designation "Surfonic® N-95".

"MR Light"—a polymeric MDI commercially available from Bayer Corporation under the designation Mondur® MR (Light).

"Mondur® 489"—a polymeric MDI (diphenylmethane diisocyanate) commercially available from Bayer Corporation.

"Free-Rise Density"—Density of the foam when the foam-forming ingredients thereof are mixed in an open vessel (see U.S. Pat. No. 6,727,290, which is incorporated by reference herein in its entirety.

"In-Place Density"—The apparent cured density of the foam as it exists in the final form or part into which it is dispensed. The in-place density is generally higher than the free-rise density of the foam and will vary depending on the actual amount of foam that is dispensed into a cavity of fixed volume.

TABLE II

Comparative Examples D–J and Invention Example 5:
Formulations and Flame Spread and Smoke Density Properties

|  | D | E | F | G | H | I | J | 5 | 6 |
|---|---|---|---|---|---|---|---|---|---|
| Ingredients |  |  |  |  |  |  |  |  |  |
| Part A |  |  |  |  |  |  |  |  |  |
| MR Light | 365 | 407 | 151 | 114 | 440 | 137 | 445 |  |  |
| M-489 |  |  |  |  |  |  |  | 90 | 90 |
| Part B |  |  |  |  |  |  |  |  |  |
| Terate ® 4020 |  |  |  |  |  |  |  | 73.5 | 74.17 |
| Terate ® 2031 |  |  |  |  |  |  |  |  |  |
| Terate ® 2540 | 85.55 |  | 60.00 | 60.00 | 84.80 |  | 84.00 |  |  |
| PD-110LV |  | 81.60 |  |  |  |  |  |  |  |
| GSP-355 |  |  | 18.70 | 18.70 |  | 65.37 |  |  |  |
| TEAP-265 |  |  |  |  |  |  |  | 3.00 | 3.00 |
| SPA-357 |  |  |  |  |  | 15.00 |  |  |  |
| V-280 |  |  |  |  |  |  |  |  |  |
| PHT4-Diol |  |  |  |  |  |  |  | 14.00 | 14.00 |
| Fyrol PCF | 5.00 | 7.00 | 5.00 | 5.00 | 5.00 |  |  | 7.00 | 7.00 |
| Fyrol 6 |  |  |  |  |  | 15.00 |  |  |  |
| Dabco A-33 |  |  |  |  |  | 0.60 |  |  |  |
| Dabco 8154 |  |  |  |  |  |  |  |  |  |
| Toyocat F-94 |  |  |  |  |  |  |  | 0.15 | 0.15 |
| Dabco K-15 | 5.50 | 7.00 | 0.33 | 0.33 | 6.40 |  | 6.20 |  |  |
| Curithane 52 |  |  |  |  |  |  |  |  |  |
| Dabco 120 |  |  |  |  |  | 0.03 |  |  |  |
| B-8408 |  |  | 1.20 | 1.20 |  |  | 2.00 | 1.20 | 1.20 |
| B-8418 | 2.00 |  |  |  | 2.00 |  |  |  |  |
| B-8433 |  | 2.00 |  |  |  | 2.00 |  |  |  |
| N-95 |  |  | 14.00 | 14.00 |  |  |  |  |  |
| Water | 1.95 | 2.40 | 0.77 | 0.77 | 1.80 | 2.00 | 1.80 | 1.15 | 0.48 |
| Sum | 100.00 | 100.00 | 100.00 | 100.00 | 100.00 | 100.00 | 100.00 | 100.00 | 100.00 |
| Mix Ratio (B/A) | 100/365 | 100/407 | 100/151 | 100/114 | 100/440 | 100/137 | 100/445 | 100/90 | 100/90 |

TABLE II-continued

Comparative Examples D–J and Invention Example 5:
Formulations and Flame Spread and Smoke Density Properties

|  | D | E | F | G | H | I | J | 5 | 6 |
|---|---|---|---|---|---|---|---|---|---|
| Properties |  |  |  |  |  |  |  |  |  |
| Free-Rise Density (pcf) | 5.10 | 5.00 | 7.00 | 7.00 | 6.78 | 10.00 | 2.90 | 6.50 | 15.00 |
| In-Place Density (pcf) | 14.00 | 14.00 | 15.50 | 15.50 | 14.00 | 20.00 | 5.50 | 14.00 | 30.00 |
| Thickness of Panel (in) | 1 | 1 | 1.25 | 1.25 | 1 | 1 | 1 | 1 | 1 |
| Flame Spread | 50 | 50 | 215 | 145 | 40 | 200 | 25 | 20 | 20 |
| Smoke Density | 850 | 950 | 400 | 700 | 750 | 800 | 200 | 300 | 450 |

Although the formulation of Comparative Example "J", as shown in Table II above, met ASTM E-84 Class 1 standards, the formulation had poor processability in high-density applications, i.e., the formulation reacted too quickly, was too brittle, and required the processing equipment to dispense material at an extremely large mix B/A ratio. Typically, processing equipment in these processes will operate efficiently at B/A mix ratios of no more than about 2/1 (i.e., 2 parts by weight of B per 1 part by weight of A).

The formulations of Invention Examples 5 and 6 were well-formulated systems with good processability and with an ASTM E-84 Class 1 rating.

When Invention Example 5 was repeated with a two-inch panel rather than a one-inch panel, the resulting Flame Spread was 20 (i.e., the same as with the one-inch panel) and the smoke density was 450, thus meeting ASTM E-84 Class 1 Standards.

Further modifications and variations of the foregoing will be apparent to those skilled in the art and are intended to be encompassed by the claims appended hereto.

What is claimed is:

1. An all-liquid foam-forming system for forming a rigid, high density polyurethane foam having a density of at least about 5 pcf and an ASTM E-84 Class 1 rating, consisting of:
   a first liquid part (A) consisting of polymethylene polyphenylene polyisocyanates; and
   a second liquid part (B) consisting of at least one liquid aromatic polyester polyol having an hydroxyl value of 295-350 mg KOH/gram and a hydroxyl functionality of 2.0-2.2, said at least one liquid aromatic polyester polyol being present in an amount of at least 26% by weight of the combined weight of parts (A) and (B), diethylene glycol, a halogen-substituted organic phosphate and a brominated organic compound, water, at least one liquid tertiary amine for catalyzing reaction between said first liquid part (A) and said aromatic polyester polyol, a triethanolamine propoxylated polyol, from 0 to no more than 2.0% by weight of one or more polyether polyols based on the combined weight of part (A) and part (B), and, optionally, a liquid surfactant;
   wherein the system has an NCO/OH ratio of 0.95:1 to 1.2:1 and parts (A) and (B) are provided at a mix ratio (B/A) of 1:0.9 by weight and react to form the rigid, high density polyurethane foam having the ASTM E-84 Class 1 rating and a density of at least about 5 pcf.

2. A system according to claim 1, wherein the halogen-substituted organic phosphate is tris(2-chloroisopropyl)phosphate and the brominated organic compound is tetrabromophthalate diol.

3. A system according to claim 1, wherein the halogen-substituted organic phosphate and the brominated organic compound are about 3% to about 16% by weight of the combined weight of the first part (A) and the second part (B).

4. A system according to claim 1, wherein the halogen-substituted organic phosphate and the brominated organic compound are about 6% to about 14% by weight of the combined weight of the first part (A) and the second part (B).

5. A system according to claim 1, wherein the halogen-substituted organic phosphate and the brominated organic compound are about 8% to about 12% by weight of the combined weight of parts (A) and (B).

6. A rigid, high-density polyurethane foam having an ASTM E-84 class 1 rating and a density of at least about 5 pcf, consisting of the reaction product between:
   a first liquid part (A) consisting of polymeric diphenylmethane diisocyanate, 4,4'-diphenylmethane diisocyanate, and diphenylmethane diisocyanate mixed isomers; and
   a second liquid part (B) comprising of at least one aromatic polyester polyol having an hydroxyl value of 295-350 mg KOH/gram and a hydroxyl functionality of 2.0-2.2, diethylene glycol, a halogen-substituted organic phosphate, a brominated organic compound, water, a triethanolamine propoxylated polyol, at least one tertiary amine which catalyzes the reaction between the first liquid part (A) and said at least one aromatic polyester polyol, from 0 to no more than 2.0% by weight of one or more polyether polyols based on the combined weight of part (A) and part (B), and, optionally, a liquid surfactant;
   wherein the foam-forming system having an NCO/OH ratio of 0.95:1 to 1.2:1 and parts (A) and (B) are provided at a mix ratio (B/A) of 1:0.9 by weight.

7. A shaped object consisting of the rigid, high-density polyurethane foam according to claim 6.

8. An all-liquid foam-forming system for forming a rigid, high density polyurethane foam having a density of at least about 5 pcf and an ASTM E-84 Class 1 rating, consisting of:
   a first liquid part (A) consisting of 60-100 wt % polymeric diphenylmethane diisocyanate, 20-30 wt % 4,4'-diphenylmethane diisocyanate, and 1-5 wt % 2,4'-diphenylmethane diisocyanate mixed isomers, and
   a second liquid part (B) consisting of at least one aromatic polyester polyol having an hydroxyl value of 295-350 mg KOH/g and an hydroxyl functionality of 2.0-2.2, diethylene glycol, a tetrabromophthalate diol having a molecular weight of about 520 and a hydroxyl value of about 215, a tris(2-chloroisopropyl)phosphate flame retardant, water, at least one liquid tertiary amine, a triethanolamine propoxylated polyol, and a liquid silicone surfactant; and
   said at least one liquid aromatic polyester polyol being present in an amount of at least 26% by weight of the combined weight of parts (A) and (B);
   wherein the system has an NCO/OH ratio of 0.95:1 to 1.2:1; and parts (A) and (B) are provided at a mix ratio (B/A) of about 1:0.9 by weight and react to form the foam having an ASTM E-84 Class 1 rating at a density of at least about 5 pcf.

9. A system according to claim 1 wherein the polymethylene polyphenylene polyisocyanates of the first liquid part (A) consist of polymeric diphenylmethane diisocyanate, 4,4'-diphenylmethane diisocyanate, and diphenylmethane diisocyanate mixed isomers.

* * * * *